Sept. 20, 1966 R. L. EARLY ETAL 3,273,710
BOTTLE GAUGING

Original Filed July 14, 1960 9 Sheets-Sheet 1

INVENTORS
RICHARD L. EARLY &
THOMAS B. SORBIE
BY
J. R. Nelson
and W. A. Schaich
ATTORNEYS Sept. 20, 1966 R. L. EARLY ETAL 3,273,710
BOTTLE GAUGING
Original Filed July 14, 1960 9 Sheets-Sheet 3

INVENTORS
RICHARD L. EARLY &
THOMAS B. SORBIE
BY
ATTORNEYS

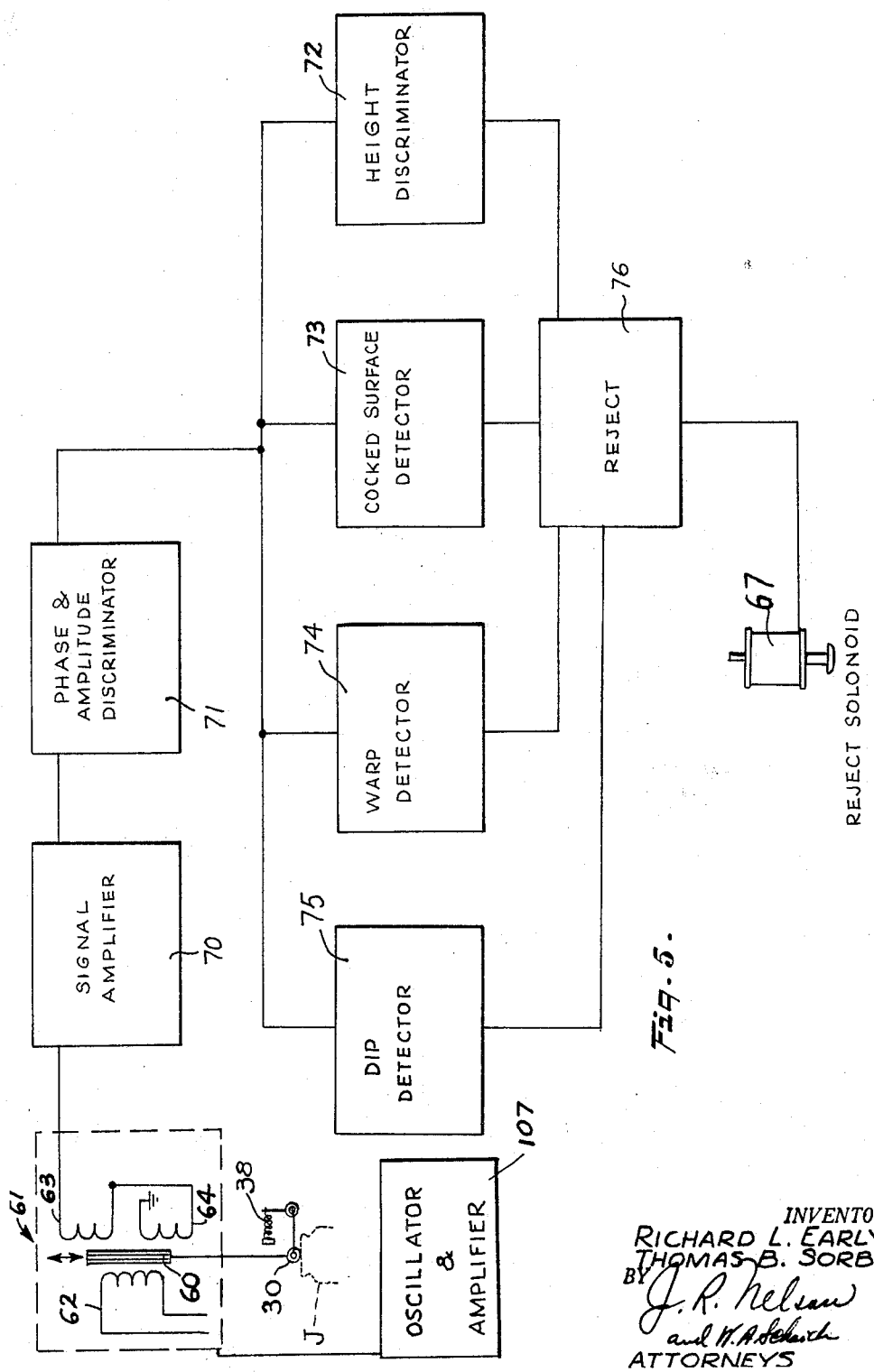

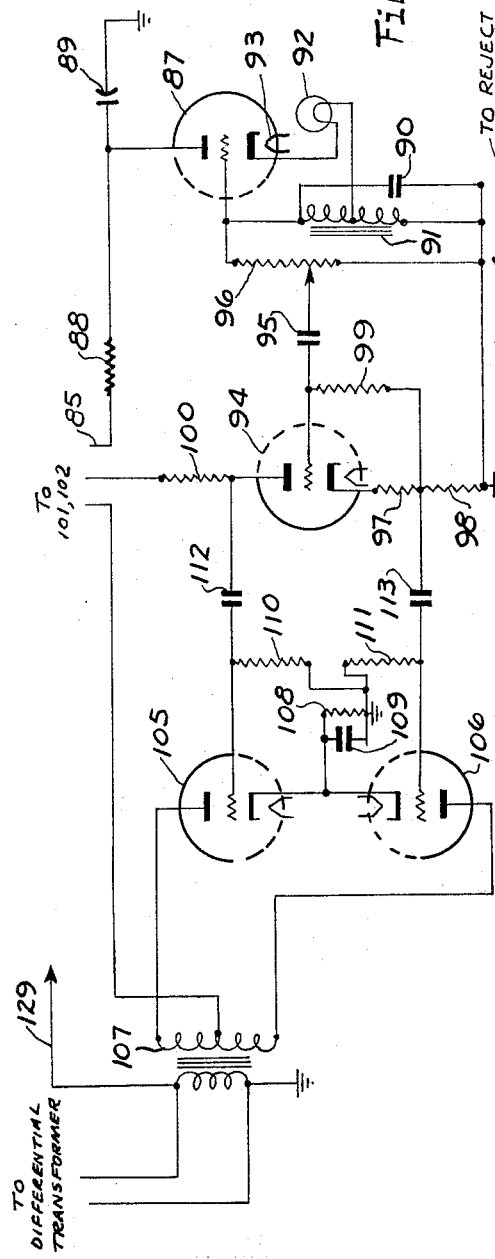
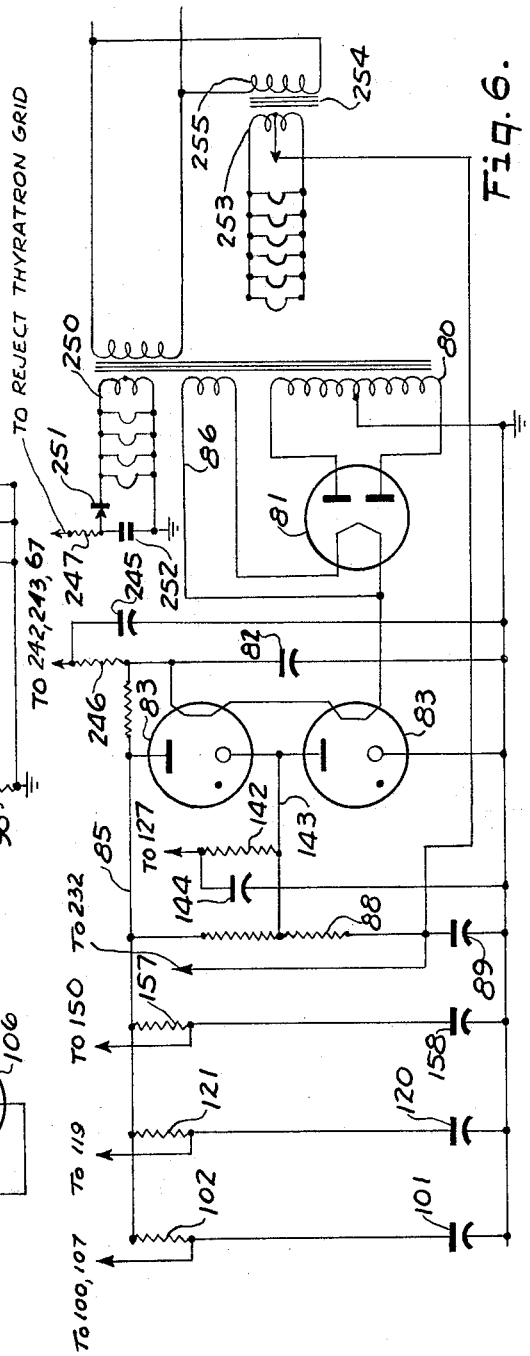

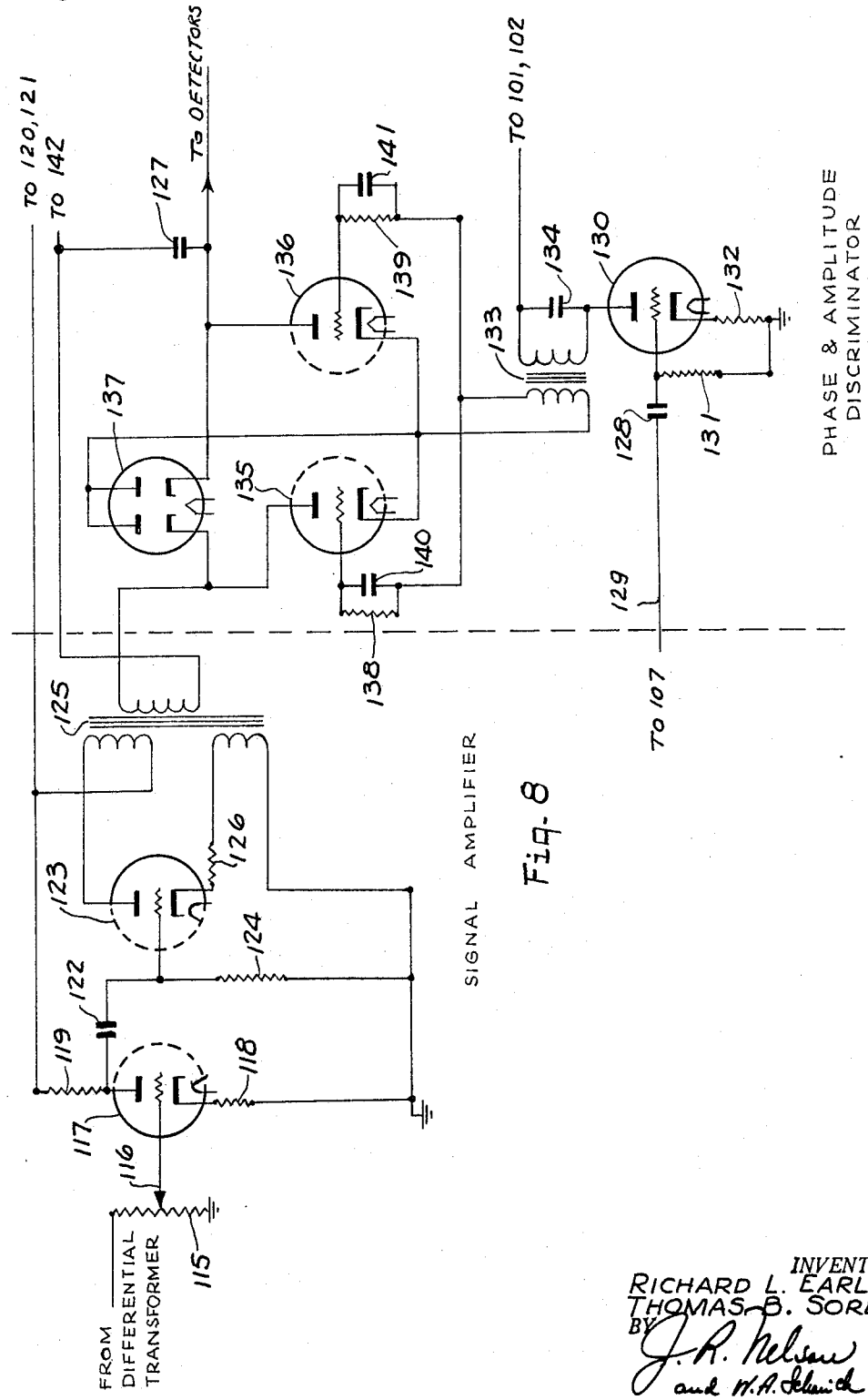

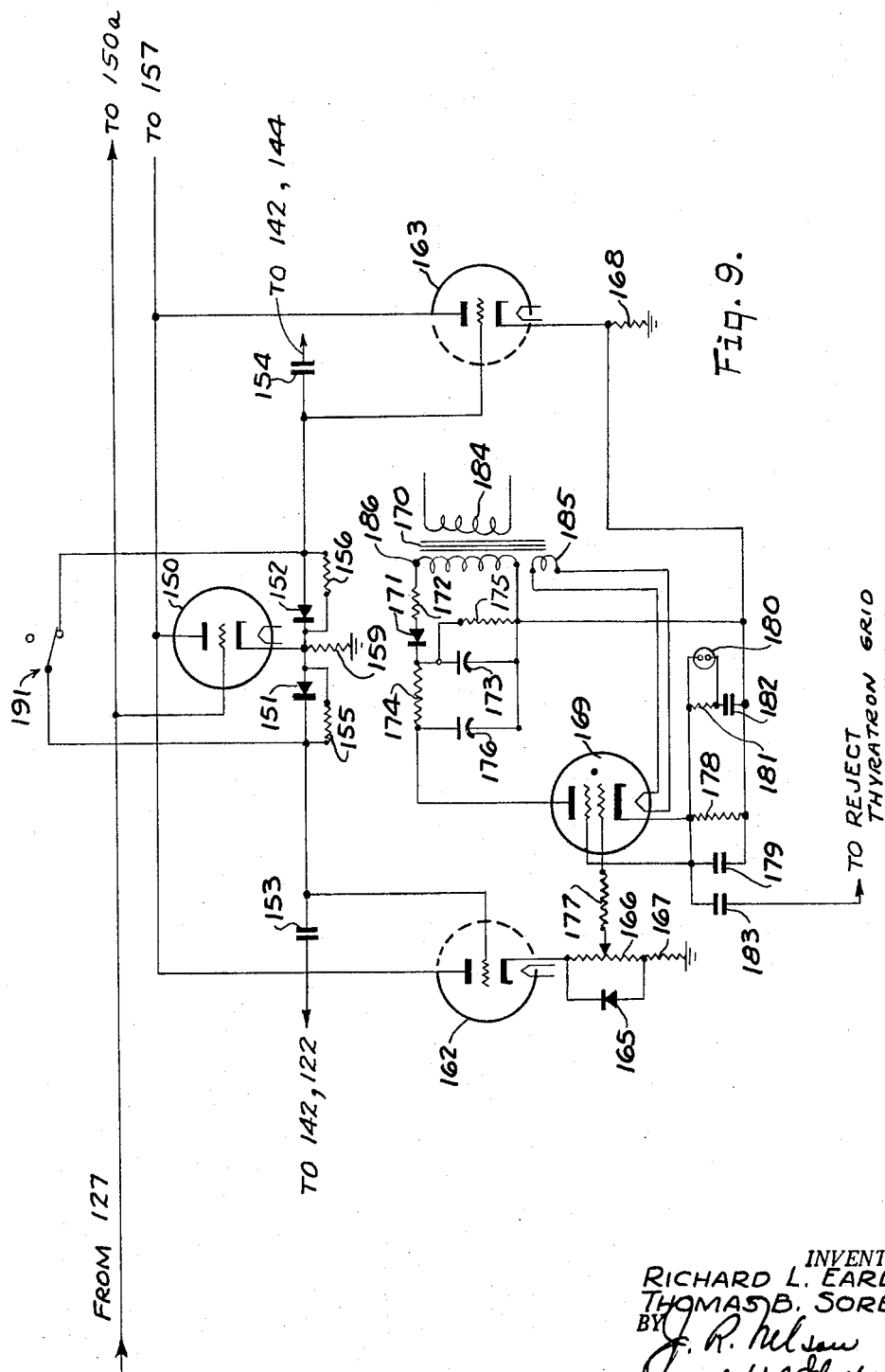

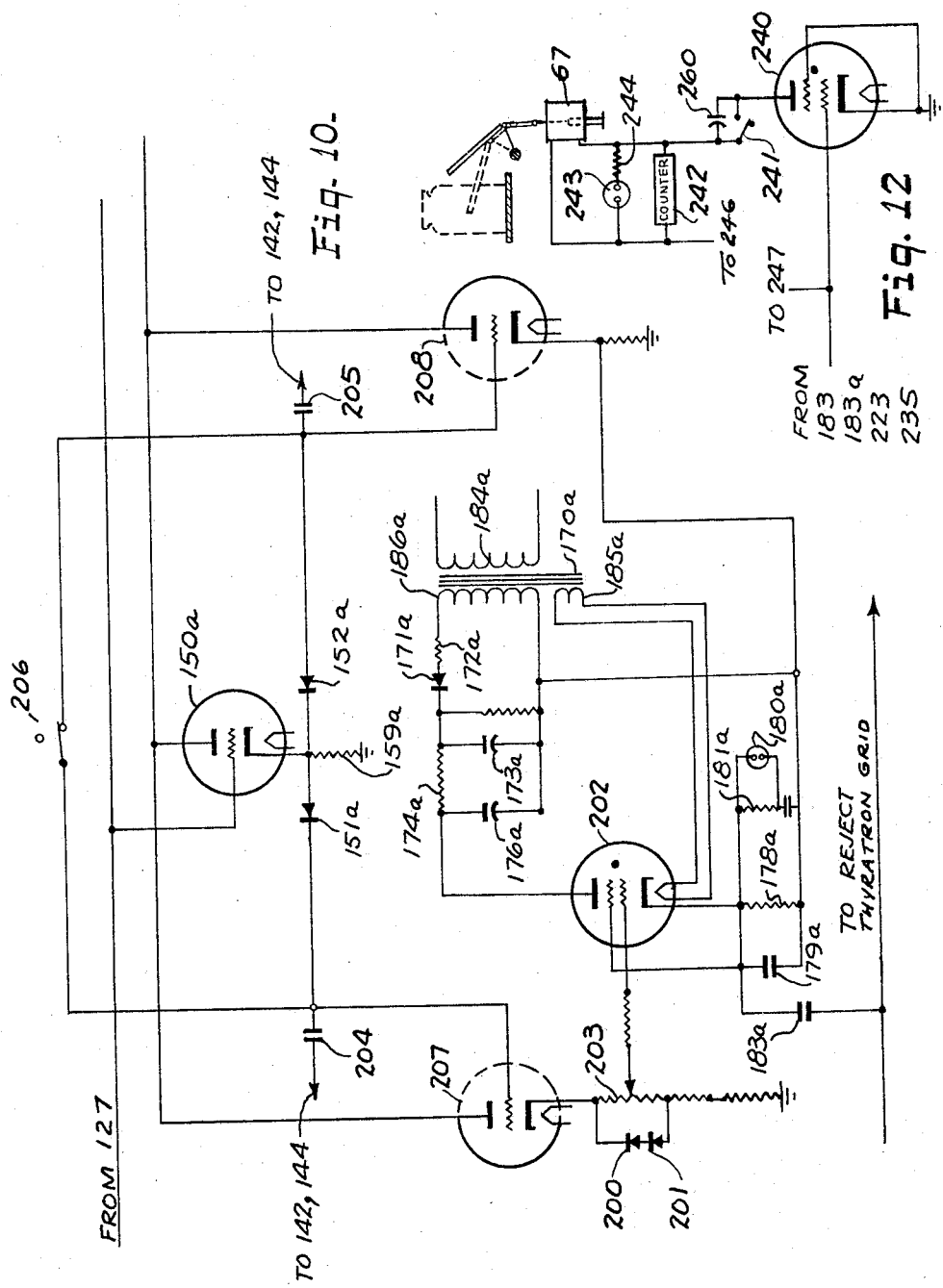

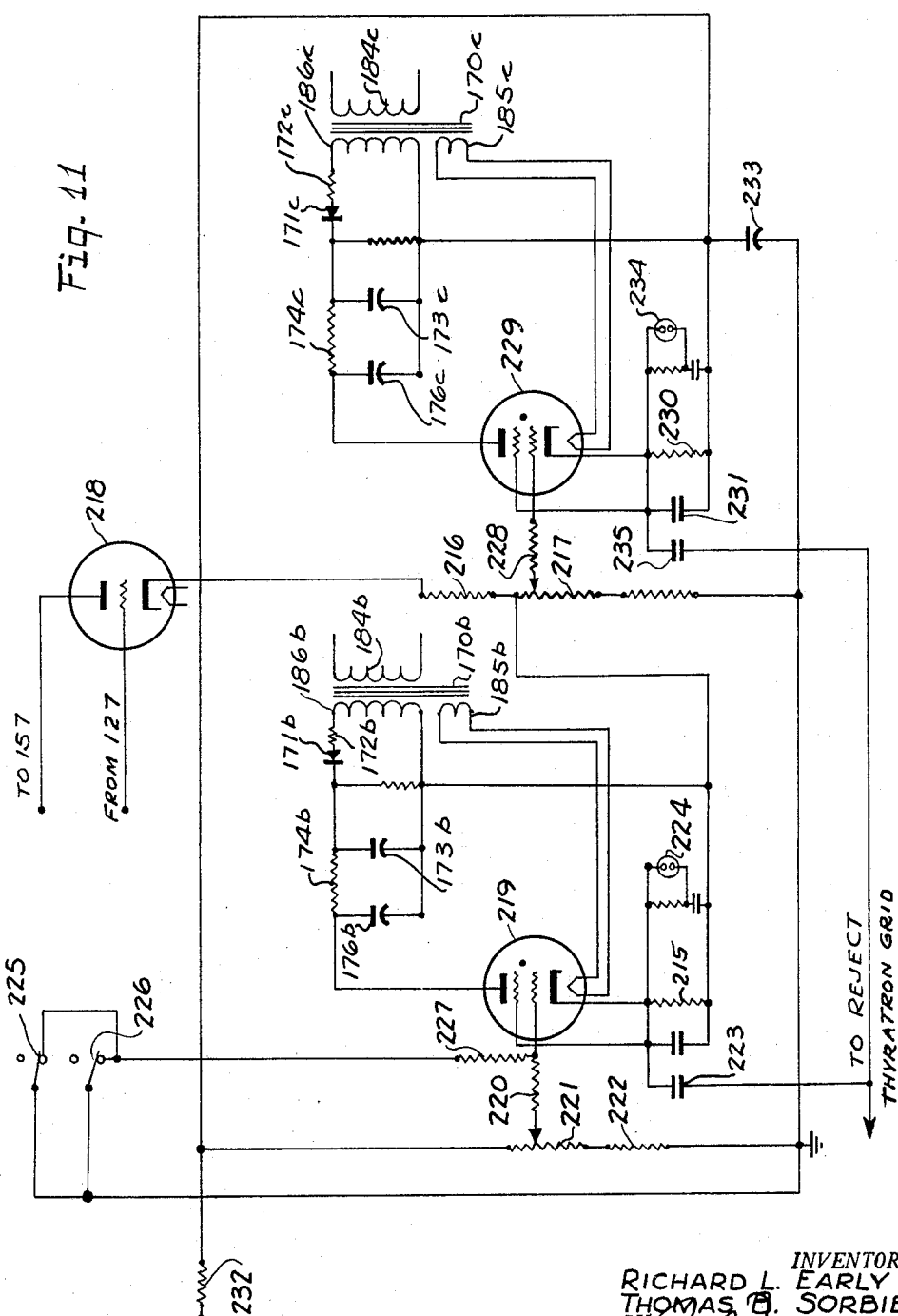

United States Patent Office 3,273,710
Patented Sept. 20, 1966

---

3,273,710
BOTTLE GAUGING
Richard L. Early and Thomas B. Sorbie, Toledo, Ohio, assignors to Owens-Illinois Inc., a corporation of Ohio
Continuation of application Ser. No. 42,837, July 14, 1960. This application Dec. 4, 1963, Ser. No. 329,342
15 Claims. (Cl. 209—88)

This is a continuation of our copending application Serial No. 42,837, filed July 14, 1960, now abandoned.

This invention relates to the inspection of containers and particularly to the inspection of hollow containers such as glass bottles and jars to determine whether the top surface of the finish thereof is within proper specification and whether they are of proper height.

In the commercial use of hollow containers such as glass bottles and jars in high-speed handling and filling apparatus, it is essential that certain dimensions and tolerances be maintained in the manufacture of such hollow containers and particularly in the top surface of the finish of the container where the top surface is used for sealing. The critical defects include moderate variations in slope of the top surface of the finish as evidenced by variations in height of the top surface around a portion of the periphery, commonly known as warp; more abrupt variations in slope of the top surface of the finish as evidenced by variations in height of the top surface around a lesser portion of the periphery than for warp, commonly known as dip; extreme variations between the highest point and the lowest point on the top surface, commonly known as cocked finish; and over or under height.

It is therefore an object of this invention to provide a method and apparatus for inspecting hollow containers.

It is a further object of the invention to provide such a method and apparatus for inspecting such containers to determine whether there is excessive warp in the top surface of the finish of such containers.

It is a further object of the invention to provide such a method and apparatus for inspecting such containers to determine whether there is excessive dip in the top surface of the finish of the container.

It is a further object of the invention to provide such a method and apparatus for checking the level of the top surface of the finish of such containers.

It is a further object of the invention to provide such a method and apparatus for checking the height of such containers.

It is a further object of the invention to provide such a method and apparatus for inspecting containers wherein containers are simultaneously checked for excessive warp finish, excessive dip finish, cocked finish and over or under height.

Basically, the invention comprises bringing a contact member into contact with the top surface of the finish of the container and causing relative rotation between the container and the contact member so that the contact member traverses the top surface of the container. The position of the contact member and the variation in height thereof as the relative rotation takes place is transmitted into a variation in voltage through a differential transformer and this position and variation is analyzed by electronic mechanisms to determine whether there is excessive warp, dip or cocked finish or whether the height exceeds predetermined limits.

In the drawings:

FIG. 5 is a block diagram of the electronic circuit.

FIG. 6 is a wiring diagram of the power supply.

FIG. 7 is a wiring diagram of the oscillator, inverter and amplifier.

FIG. 8 is a wiring diagram of the signal amplifier and phase and amplitude discriminator.

FIG. 9 is a wiring diagram of the warp or dip detector.

FIG. 10 is a wiring diagram of the cocked finish detector.

FIG. 11 is a wiring diagram of the height discriminator.

FIG. 12 is a wiring diagram of the reject mechanism.

Figure 1:
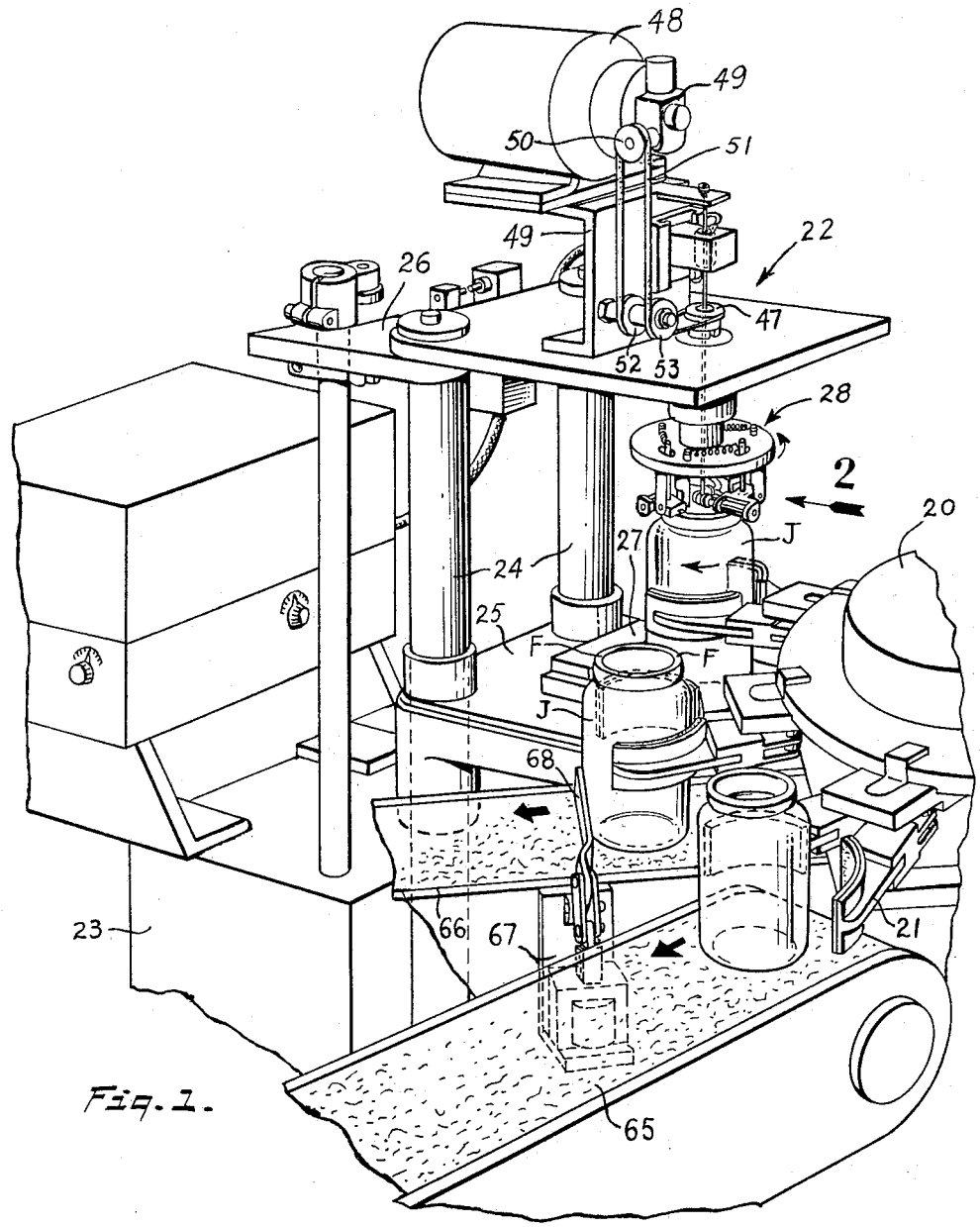
FIG. 1 is a fragmentary perspective view of an apparatus embodying the invention.

Referring to FIG. 1, the apparatus is intended for inspecting hollow containers such as glass jars J. The jars J are of the type having an open upper end, commonly known as a finish, defining a top surface. The jars J are adapted to be brought to the gauging position by a bottle transfer carriage 20 which includes a plurality of pairs of jaws 21 that are adapted to open and close about a jar J. Such a mechanism is shown and described in the patent to Fedorchak et al. 2,682,802.

The gauging apparatus 22 comprises a base 23 including vertical shafts 24 on which vertically spaced plates 25, 26 are supported. A vertically movable pad 27 is mounted on the plate 25. The transfer carriage 20 is adapted to deliver a jar J to the pad 27. The pad 27 is then moved upwardly to a predetermined level, by an apparatus not shown, bringing the jar J into engagement with a gauging head 28 mounted on the plate 26. Gauging head 28 is adapted to rotate in the direction of the arrow shown in FIG. 1 and thereby gauge the finish and height of the jar J as presently described.

Figure 2:
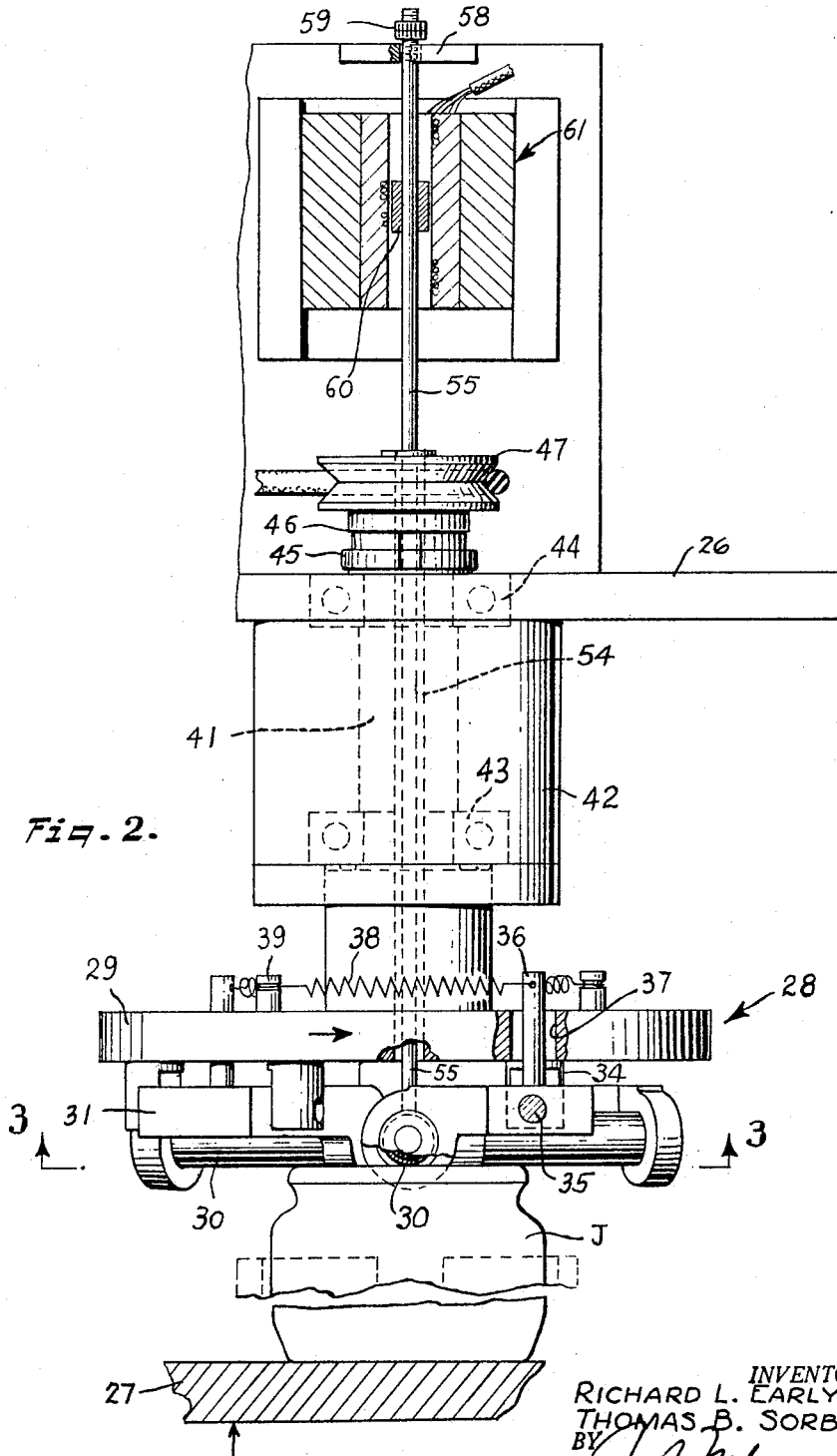
FIG. 2 is a part sectional fragmentary elevation taken along the arrow 2 in FIG. 1.
Figure 3:
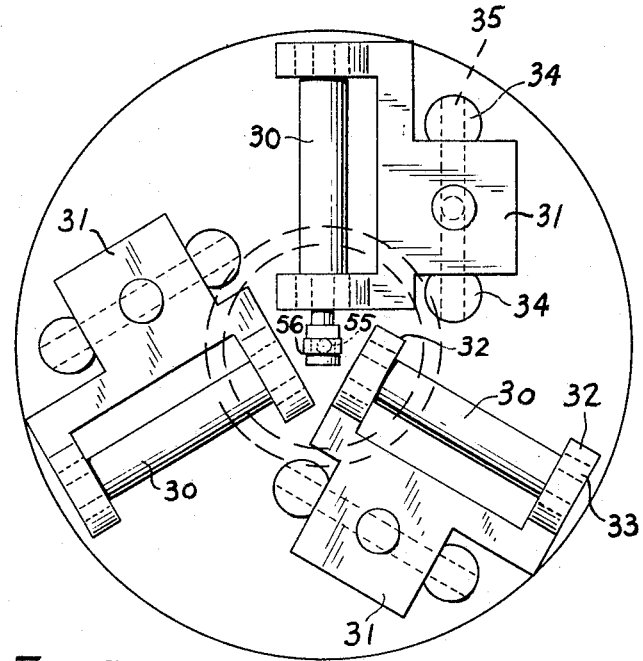
FIG. 3 is a view taken along the line 3—3 in FIG. 2.
Figure 4:
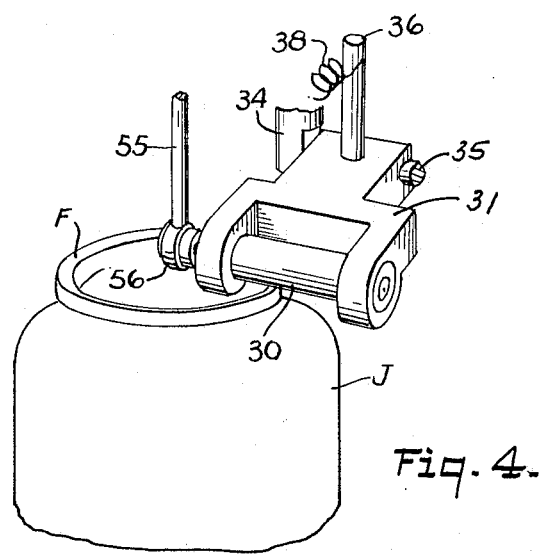
FIG. 4 is a fragmentary perspective view of a portion of the apparatus shown in FIG. 2.

Referring to FIGS. 2, 3 and 4, gauging head 28 comprises a support hub 29 on the underside of which rollers 30 are supported for rotation about horizontal axes parallel to the upper surface of the movable pad 27 and for vertical movement, as presently described. Each roller 30 is rotatably mounted in a carrier 31 which includes a pair of spaced arms 32 supporting bearings 33 into which the reduced ends of roller 30 extend. Each carrier 31 is mounted for limited vertical pivoting movement relative to the support hub 29 between posts 34 extending downwardly from the underside of hub 29 by a shaft 35. Each roller 30 and its respective carrier 31 are yieldingly urged downwardly by an arrangement which includes a rod 36 mounted on each carrier 31 above shaft 35 and extending upwardly through an opening 37 in support hub 29. A tension spring 38 extends between the upper end of each rod 36 and a fixed pin 39 on the upper surface of support hub 29. Pin 36 contacts the side of opening 37 in hub 39 to limit the downward pivotal movement of the carrier and roller. The surface of pad 27 is accurately positioned so that it is perpendicular to the axis of head 28.

As the pad 27 is elevated, the jar J thereon is moved upwardly to a predetermined level bringing top surface F of the jar into contact with the rollers 30 so that the rollers 30 assume the general position shown in FIG. 2. As the head 28 is rotated relative to the jar J, the rollers 30 follow the top surface F of the jar J and move upwardly and downwardly in response to variations in the height of each successive portion thereof.

The movement of one of the rollers 30 is transmitted to a sensing device and utilized, as presently described, to check for warp finish, dip finish, cocked finish and height. The other two rollers 30 are used as guide rollers to provide firm support of the jar J on the pad 27.

As shown in FIG. 2, head 28 is rotatably mounted on plate 26 by an arrangement which includes a shaft 41 on the lower end of which the head 28 is fixed. Shaft 41 extends upwardly and is rotatably mounted in a bearing housing 42 by spaced bearings 43, 44. The upper end of the shaft is held in position by a collar 45 and nut 46. A pulley 47 is fixed on the upper end of the shaft 41. A motor 48 mounted on a bracket 49 on plate 26 includes a gear reduction mechanism 49 that drives a pulley 50 that is mounted for rotation about a horizontal axis (FIG. 1). An endless belt 51 is trained over pulley 50, idler pulleys 52, 53 which are rotatably mounted on bracket 49 and over the pulley 47 on shaft 41. By this arrangement, the head 28 is rotated about its axis and the axis of the jar J to cause the rollers 30 to traverse the top surface F of the jar J.

Shaft 41 is provided with an axial opening 54 and a spindle 55, preferably of plastic or other non-magnetic material, extends through the opening. The lower end of the spindle is connected to the shaft of one of the rollers 30 by a swivel member 56. The upper end of the spindle 55 extends upwardly through a plate 58 on bracket 49 and a nut 59 is threaded thereon to limit the downward movement of the spindle 55. Spindle 55 actuates the core 60 of a differential transformer 61, the core 60 being fixed on the spindle 55 intermediate its ends and adjacent the upper end thereof. Differential transformer 61 is of conventional construction and, as shown diagrammatically in FIG. 5, comprises a primary 62 and a pair of secondary windings 63, 64 connected in series opposing relation. Shifting the core 60 to one end of the differential transformer increases the voltage induced into the secondary winding located at that end and reduces the voltage induced in the opposite secondary winding. The signal appearing across the output windings is proportional to the distance the core is off electrical center, being near zero when the core is at electrical center; at the same phase as the transformer input signal when the core is displaced in one direction, and 180 degrees out of phase to the input signal when the core is displaced in the opposite direction. The position of the core 61 corresponds to the height of the finish at any predetermined point and therefore the height of the container at any predetermined point is indicated by the output of the transformer. If the container has an excessive warp finish, then the core will move more than a predetermined amount in a predetermined degree of peripheral movement of the roller. If the container has an excessive dip, then the core 61 will move more than a predetermined amount in a predetermined lesser degree of peripheral movement of the roller than in checking for warp. If the container has an excessive cocked finish, then the core 61 will move more than a predetermined amount between its highest and lowest point. If the height of the container is beyond predetermined limits, then the core 61 will move more than a predetermined amount in one direction or another. These movements are converted into a voltage signal in the differential transformer and by an electronic mechanism as presently described are utilized to check and reject the container in the event that it is improper.

A suitable reject mechanism is provided. As shown in FIG. 1, the reject mechanism includes a reject conveyor 65. After the container has been checked at the gauging station, the gripping jaws 21 engage the jar J and move it into position on the conveyor 66 where it is released. If the container was within prescribed limits, it is permitted to pass and move along with the conveyor 66. On the other hand, if the container was not within the prescribed limits, then the solenoid 67 will have been actuated bringing arm 68 into position to prevent the removal of the jar J by movement of the conveyor 66. When the carriage 30 is again actuated, the jaws 21 close about the jar J on the conveyor 66 and move it to the reject conveyor 65 so that when the jaws 21 again open, the jar J is free to be moved along with the conveyor 65 and therefore be rejected.

The overall wiring diagram is shown in FIG. 5, whereine signal from the differential transformer 61 is amplified in an amplifier 70 and then passes to a phase and amplitude discriminator 71. The signal then passes to height discriminator 72, cocked surface detector 73, warp detector 74 and dip detector 75. If the signal is not within the limits of each of these discriminators or detectors, a reject signal is created which passes to the reject mechanism 76 that actuates reject solenoid 67 after an appropriate time delay.

Power supply

The electronic device includes a device for providing regulated direct current voltages for the operation of the gauging apparatus. The power supply, as shown in FIG. 6, comprises a Sola voltage regulating transformer 80, a full wave rectifier 81, a filter condenser 82, two voltage regulator tubes 83, a power bus 85 which is at a predetermined positive potential to ground and a power bus 143 which is at another predetermined voltage to ground lower than the bus 85. The filament of rectifier tube 83 is heated by a winding 86 of transformer 80.

Oscillator

As shown in FIG. 7, an oscillator is provided and includes one-half 87 of 6SN7 dual triode tube which is connected so as to form a modified Hartley oscillator. The anode of triode 87 is connected through a resistance 88 to the bus 85 (FIGS. 6 and 7). A filter condenser 89 is connected between the anode of triode 87 and ground. A tank circuit is provided and comprises a condenser 90 and an inductance 91 in parallel and connected from the ground to the grid of tube 87. A resistance such as a lamp 92 connects the cathode of triode 87 to a tap on the inductance 91. The heater 93 of triode 87 receives power from the winding of transformer 80. The oscillator is so arranged and disposed as to maintain the circuit in a continuous state of oscillation on the order to 8000 cycles per second.

The other triode 94 of the 6SN7 tube is connected in a conventional phase inverter circuit. The grid of triode 94 receives its signal from the oscillator through a condenser 95 which is connected to an adjustable tap of a potentiometer 96 connected in parallel with the oscillator tank circuit formed by condenser 90 and inductance 91. A cathode biasing resistor 97 is connected between the cathode of tube 94 and the junction of a cathode load resistor 98 and a control grid resistor 99. The control grid resistor 99 is connected to the control grid of the tube 94. The other end of the cathode load resistor 98 is connected to ground. An anode load resistor 100 is connected between the anode of tube 94 and the junction of a filter condenser 101 and a decoupling resistor 102 (FIG. 6). The other end of the resistor 102 connects to the bus 85.

The amplitude of the output signals available at the anode of the triode 94 and the junction of the resistances 97, 98 may be controlled by the position of the adjustable tap of potentiometer 96. The signal appearing at the anode of the triode 94 is slightly less in amplitude and 180 degrees out of phase with the signal at the grid of the triode 87. The signal at the junction of resistances 97, 98 is equal in amplitude to the signal at the anode of triode 94 and in phase with the signal at the grid of triode 94. The respective output signals are suitable for driving a push-pull amplifier as presently described.

Referring to FIG. 7, the push-pull amplifier comprises a 6BL7 tube comprising triodes 105, 106. Triode 105 has its anode connected to one terminal of the primary winding of a transformer 107. The other terminal of the primary winding of transformer 107 is connected to the anode of the other triode 106. The center tap of the primary winding of transformer 107 connects to a positive direct current supply at the juncture of resistance 101 and condenser 102. A parallel combination of cathode biasing resistor 108 and bypass condenser 109 connects between ground and the cathode of triodes 105, 106. Control grid resistances 110, 111 connect between ground and the control grids of triodes 105, 106, respectively. The control grid of triode 105 receives its signal from the anode of triode 94 through a coupling condenser 112. The control grid of triode 106 receives its signal from the juncture of resistances 97, 98 through a coupling condenser 113. The above arrangement comprises a push-pull amplifier so disposed that faithful amplification of the signals received from the phase inverter is executed. The output winding of transformer 107 connects to the primary of the differential transformer 61 presently described.

*Differential transformer*

Referring to FIG. 5, the primary 62 of differential transformer receives alternating current from the output winding of transformer 107 (FIG. 7). The secondary windings 63, 64 of the differential transformer are so disposed with relation to the primary winding 62 that the position of the movable core 60 results in an output voltage that is proportional to the displacement of the core from the electrical center of the differential transformer. The output voltage resulting from a placement of the core in one end of the differential transformer results in an output voltage in phase with the energizing voltage. The output voltage resulting from a placement of the core in the opposite end of the differential transformer results in an output voltage 180 degrees out of phase with the energizing voltage. Since the core of the differential transformer is connected to one of the rollers 30 traversing the top surface F of the jar J being inspected, the amplitude and phase of the output voltage of the differential transformer is controlled by the position of the core 60 which, in turn, is dependent on the position of the roller traversing the jar or container being inspected.

*Signal amplifier*

Referring to FIG. 8, the output windings of the differential transformer are shunted by a potentiometer 115 one end of which is connected to ground. An adjustable tap 116 on potentiometer 115 connects to the control grid of one half 117 of 6SN7 tube. A cathode bias resistor 118 is connected between ground and the cathode of triode 117. An anode load resistor 119 is connected between the anode of triode 117 to a positive direct current voltage supply at the juncture of a filter condenser 120 and de-coupling resistor 121 (FIG. 6). The other end of the de-coupling resistor 121 connects to the voltage supply through bus 85. A coupling condenser 122 connects the anode of triode 117 to the control grid of the other half 123 of the 6SN7 tube. A grid resistance 124 connects between the control grid of triode 123 and ground. The primary winding of a transformer 125 is connected between the anode of triode 123 and a positive direct current supply at the juncture of the condenser 120 and resistor 121 (FIG. 6). One terminal of an inverse current feedback winding of transformer 125 connects to ground and the other terimnal of the winding connects to a cathode bias resistor 126. The other end of the cathode bias resistor connects to the cathode of triode 123. In this fashion, the elements 115 to 126 are disposed so that the signal appearing at the output winding of the transformer 125 is a faithful amplified reproduction of the signal appearing across the potentiometer 115. The setting of the adjustable tap of potentiometer 115 determines the magnitude of amplification of the signal received from the secondary winding of the differential transformer.

*Phase and amplitude discriminator*

Referring to FIG. 8, the signal from transformer 125 is converted to a direct current voltage across a condenser 127 that is proportional to the amplitude of the alternating current signal voltage. The polarity of the direct current voltage across condenser 127 is determined by the phase of the alternating current signal received from the secondary of transformer 125 as compared to the phase of the signal supplied to the primary of the differential transformer.

This is achieved by a coupling condenser 128 that is connected to one end of the primary of transformer 107 by a lead 129 (FIG. 7). Coupling condenser 128 passes the alternating current from the other end of the secondary winding of transformer 107 to the control grid of one triode 130 of a 6SN7 triode tube. A grid resistance 131 connects between the control grid of triode 130 and ground. A cathode bias resistor 132 connects between the cathode of triode 130 and ground. The primary winding of a transformer 133 connects between the anode of triode 130 and a source of positive direct current at the juncture of the filter condenser 101 and decoupling resistor 102. A phase shifting condenser 134 is connected in parallel with the primary of transformer 133. Triode 130 with its associated circuit thereby forms a conventional amplifier. One terminal of the secondary winding of transformer 133 connects to the cathodes of two triodes 135, 136 and the plates of the diodes of a 6AL5 tube 137. The other terminal of the secondary winding of transformer 133 connects to two resistances 138, 139 and two condensers 140, 141. Resistor 138 and condenser 140 are connected in parallel to the control grid of triode 135. Resistor 139 and condenser 141 are connected in parallel to the control grid of triode 136.

The signal received from the secondary of transformer 107 is amplified by triode 130 and causes an alternating current across the secondary of transformer 133 which, in turn, causes electric current flow in the triode 135 through a rectifier circuit comprising the cathode to control grid resistance of triode 135, resistor 138, condenser 140 and the secondary transformer 133. Condenser 140 thereby charges to a direct current voltage approximately equal to the peak voltage across the secondary of transformer 133. The plate of condenser 140 connected to the grid of triode 135 is the negative plate. Because the condenser 140 discharges slowly through resistor 138, the direct current voltage across condenser 140 stays fairly constant. The voltage appearing from the cathode to the grid of triode 135 is the sum of the voltage across the condenser 140 and the instantaneous voltage across the secondary of transformer 133 so that the grid of triode 135 is maintained at a negative potential to the cathode of triode 135 except during the time that the condenser 140 is being charged. The negative potential at the grid of triode 135 during most of the cycle prevents any flow of plate current in triode 135, during that portion of the cycle. When condenser 140 is being charged by transformer 133, the grid of triode 135 is not negative to its cathode, and plate current may flow through triode 135 provide the plate of triode 135 is positive to its cathode, which is the case if voltage of the lower plate of condenser 127 is at negative potential to the voltage present at the upper terminal of the secondary of transformer 125. Triode 135 is thereby operated as a gate, by the reference voltage from triode 130 circuit. Plate current through triode 135 passes through triode 135, the secondary of transformer 125, right hand diode of rectifier 137, and condenser 127.

In like manner, triode 136 operates as a gate for charging the lower plate of condenser 127 in a negative direction. The gating control circuit for triode 136 is composed of the grid and cathode of triode 136, resistor 139, condenser 141 and the secondary of transformer 133. Condenser 127 charges in a negative direction through triode 136, diode 137 and the secondary of transformer 125, when triode 136 is gated "on," if the lower plate of condenser 127 is positive to the upper lead of the secondary of transformer 126.

As shown in FIG. 6, the upper plate of condenser 127 is biased by its connection through a resistor 142 to bus 143, which is maintained at a voltage intermediate between bar 85 and ground. A filter and by-pass condenser 144 connects from ground to the junction of resistor 142 and condenser 127.

Warp detector

The varying voltage appearing across condenser 127 is proportional to the height of the roller that travels over the top of the jar. Referring to FIG. 9, a cathode follower triode 150 has its control grid connected to the lower plate of condenser 127 and within limits reproduces a signal at its cathode that is fairly proportional to the signal across condenser 127.

Cathode follower 150 through silicon diodes 151 and 152 charges a pair of condensers 153, and 154, respectively, which with resistances 155 and 156 form the nucleus of a circuit which can be used to detect dips or deeper shallow warps in the finish of the bottle.

The anode of triode 150 connects through a resistor 157 to the positive voltage supply at bus 85. Bypass condenser 158 connects between ground and the anode of triode 150 (FIG. 6). The cathode of triode 150 connects to ground through cathode load resistor 159. The silicon diode 151 has its anode connected to the cathode of triode 150 and its cathode connected to one plate of condenser 153. The other plate of condenser 153 connects to the junction of resistor 142 and condenser 144 (FIG. 6).

When the cathode of triode 150 is positive with respect to the right plate of condenser 153, condenser 153 will charge through diode 151 to a more positive potential. When the cathode of triode 150 is not positive with respect to the right plate of condenser 153, there will be negligible current through diode 151. Condenser 154 also receives a charge from triode 150 except that condenser 154 has its charge altered through silicon diode 152 when the cathode of triode 150 is negative to the left plate of condenser 154. Condenser 153 loses its charge through resistor 155 and condenser 154 loses its charge through resistor 156.

The time constants of the combination of condensers 153, 154 and resistances 155 and 156 is such that a short vertical movement during a short rotational travel of the gauging roller causes a considerable voltage drop across resistor 155 in series with resistor 156. A longer vertical movement during a longer rotational interval will produce a similar voltage.

Two cathode follower connected triodes 162 and 163 of 6SN7 tube have their anodes connected to the voltage supply bus 85 through resistor 157. The control grid of triode 162 connects to the one plate of condenser 153. The cathode of triode 126 connects to a parallel connected zener diode 165 and potentiometer 166 which, in turn, connects to a cathode follower load resistor 167, the other end of which connects to ground. The control grid of triode 163 connects to the upper plate of condenser 154. The cathode of triode 163 connects to a cathode follower load resistor 168, the other end of which connects to ground.

The circuits of triodes 162 and 163 are so disposed that their signal output voltages are quite linear with respect to their signal input voltages, thus the voltages appearing between their respective cathodes are similar to those appearing across resistors 155 and 156 which are connected in series across the grids of triodes 162 and 163.

A means of detecting potential differences between the outputs of triode 162 and triode 163, of a magnitude that indicates the measurement of a bottle having a warp in its finish, consists of a thyratron tube 169, a power transformer 170, a rectifier 171, a current limiting resistor 172, a filter condenser 173, a filter resistor 174, a bleeder resistor 175, a filter condenser 176, a grid current limiting resistor 177, a thyratron load resistor 178, a condenser 179, a glass glow lamp 180, a resistance 181, a condenser 182 and a signal output coupling condenser 183. The primary 184 of transformer 170 connects to the mains. A first secondary 185 of transformer 170 connects to and heats the filament of thyratron 169 and a secondary 186 of transformer 170 supplies power to a conventional rectifier and filter circuit composed of elements 171 to 176, the output of which is a direct current voltage appearing across condenser 176. The positive plate of condenser 176 connects to the anode of thyratron 169. The thyratron load resistance 178 in parallel with condenser 179 connects between the cathode of thyratron 169 and the negative plate of condenser 176, and normally maintains the cathode of thyratron 169 at the same potential as the negative plate of condenser 176.

When thyratron 169 "fires" condenser 179 charges rapidly with its plate connected to the cathode of thyratron 169 becoming positive to its other plate. The resistance of resistor 178 is large, so sufficient current does not pass through it to maintain ionization of the gas in thyratron 169. Consequently, thyratron 169 soon stops conducting, whereupon condenser 179 discharges through resistance 178 allowing the cathode of thyratron 169 to return to the potential of the negative plate of condenser 176. The sharp positive voltage excursion appearing across condenser 179 is used to fire a reject thyratron as will subsequently be explained. The gas glow lamp 180 in series with condenser 182 is connected between the cathode of thyratron 169 and the negative plate of condenser 176 in such a manner as to cause lamp 180 to glow when thyratron 169 fires. Condenser 182 is normally discharged. When thyratron 169 "fires" the voltage differential between the cathode of thyratron 169 and the negative plate of condenser 176 will appear across neon lamp 180, which will "glow" and charge condenser 182. When thyratron 169 extinguishes, lamp 180 ceases to glow, and condenser 182 discharges through resistances 178 and 181. The glow of lamp 180 is a visual indication of a reject.

The control grid of thyratron 169 is connected by resistance 177 to the center tap of potentiometer 166, and is normally maintained negative to the cathode of thyratron 169, thus preventing "firing" of thyratron 169. When a smooth finish is inspected, the voltage drop across resistances 155 and 156 in series is small, and since triodes 162 and 163 are similar and their cathode load resistances are nearly equal, the potential difference between their cathodes will be almost the same as that across resistors 155 and 156 in series. Zener diode 165 maintains a constant voltage drop across potentiometer 166 wtih the lower end of potentiometer 166 negative to its cathode connected end. The tap of potentiometer 166 is adjusted to a point that maintains the control grid of thyratron 169 quite negative to the cathodes of thyratron 169 and triode 163 when a smooth finish is inspected. A greater voltage drop appears across resistors 155 and 156 in series when an uneven bottle finish is inspected, resulting in an unbalance of the voltages appearing at the cathodes of triodes 162 and 163 with the cathode of triode 162 becoming positive to the cathode of triode 163 in proportion to the voltage drop across resistors 155 and 156 in series, this action overcoming the negative potential placed upon the control grid of thyratron 169 by its connection to the adjustable tap of potentiometer 166 and causing the thyratron to "fire," which in turn causes lamp 180 to glow, and produces a positive going pulse across condenser 183. If sufficient voltage drop is maintained across resistors 155, 156 in series, thyratron 169 will continue to alternately "fire" and extinguish itself. However, one "firing" is sufficient to light the lamp and reject the defective bottle. A switch 191 connected across resistors 155 and 156 in series and operated in synchronism with the bottle transfer carriage 20 disables thyratron 169 when not gauging by shorting out resistors 155 and 156 thus maintaining the grids of triodes 162 and 163 at the same potential, which keeps a negative bias on thyratron 169 to prevent "firing."

Dip gauge detector

The dip gauge detector is identical to the warp gauge detector except that the combination of condensers 153, 154 and resistances 155, 156 is such that the container will be rejected if there is more than a predetermined voltage buildup in a predetermined period of time, shorter than the time in checking for warp, due to an abrupt variation or dip in the top of the finish.

Cocked finish detector

As shown in FIG. 10, a similar detecting system detects cocked finishes, and differs in that resistors 155 and 156 are not duplicated. Where the circuit is identical, identical reference numerals with subscripts are used. The cocked finish discriminator has two zener diodes 200 and 201 connected across detector thyratron 202 and a bias potentiometer 203 instead of corresponding single zener diode 165 connected across potentiometer 166. Since it has no bleeder resistances, condenser 204 charges to a voltage corresponding to the highest point of the top surface of the container and condenser 205 charges to a voltage corresponding to the lowest point of the top surface of the container. A switch 206 disables the circuit when not gauging by shorting across the control grids of triodes 207 and 208. Potentiometer 203 is adjusted to prevent firing of thyratron 202 until the charges on condensers 205 and 204 become unbalanced to values indicating a bottle cocked beyond limits.

Height discriminator

A thyratron detector circuit similar to those previously described measures for bottle under or over a predetermined height. As shown in FIG. 11, a detector cathode load resistance 215 connects to the junction of resistor 216 and potentiometer 217 which are part of the load resistance of cathode follower triode 218. The control grid of a thyratron 219 connects through a resistance 220 to an adjustable tap of potentiometer 221, which with a resistor 222, 232 and 88 forms a voltage divider between ground and bus 85. The adjustable tap is adjusted to provide bias voltage to the control grid of thyratron 219 that normally prevents thyratron 219 from firing. An under minimum height bottle causes a negative signal at the control grid of triode 218 which, in turn, causes a reduction in the voltage dropped across the triode cathode load resistance, and consequently lowers the voltage at the junction of resistor 215, resistor 216 and potentiometer 217 sufficiently to overcome the negative bias at control grid of thyratron 219 established by the setting of potentiometer 221. Thyratron 219 then fires and a reject pulse is transmitted to the reject thyratron through a coupling condenser 223. A neon indicator lamp 224 lights at each "firing" of thyratron 219.

Means for disabling the under height detector is provided by two parallel connected switches 225 and 226 connected from ground to a voltage dropping resistance 227 which connects to the control grid of thyratron 219. When either switch 225 or 226 is closed, resistances 220 and 227 form a series circuit between ground and the adjustable tap of potentiometer 221 which is at a voltage positive to ground and the adjustable tap of potentiometer 221 which is at a voltage positive to ground. The control grid of thyratron 219, by its connection to the junction of resistors 220 and 227, becomes negative to its normal voltage during gauging by an amount approximately equal to the voltage drop across resistor 220. This lower voltage which is established at the control grid of thyratron 219 is sufficient to prevent "firing" of thydatron 219 when the gauging roller is in its lowest position. Switch 225 operates in synchronism with the bottle transfer carriage 20 and disables the under height detector when bottles are not being gauged. Switch 226 is a "no-bottle" switch and is closed by the gauging head 28 when it is in its lowest position.

A grid current limiting resistor 228 connects the adjustable tap of potentiometer 217 to the control grid of an over height detector thyratron 229. The cathode of thyratron 229 connects through a parallel connected load resistance 230 and a condenser 231 to the junction of a decoupling resistor 232 and bypass condenser 233. Resistor 232, in turn, connects to the junction of resistor 88 and condenser 89 (FIG. 6).

The voltage at the cathode of thyratron 229 is fixed. The voltage at the control grid of a thyratron 229 is controlled through its connection through resistance 228 to the cathode load resistances of triode 218 by the position of the gauging roller. Potentiometer 217 is so adjusted to maintain the control grid of thyratron 229 sufficiently negative to the cathode to prevent "firing" of thyratron 229 except when an overheight container is being gauged. No disabling switch is necessary in the over-height detecting circuit. The reject pulse is passed to the reject thyratron through coupling condenser 235. Lamp 234 provides a visual indication of defects.

Reject thyratron

Referring to FIG. 12, a reject thyratron 240 has its anode connected to a switch 241 operated in synchronism with the bottle transfer carriage 20 and closed during the gauging period. A counter 242, a neon indicator lamp 243 in series with its current limiting resistance 244, and a reject solenoid 67 are connected in parallel between the other contact of switch 241 and a source of positive direct current available at the junction of a plate of a condenser 245 and a current limiting resistance 246 which resistance in turn connects to the filament of the rectifier 81 (FIG. 6). The other plate of condenser 245 connects to ground. The control grid of thyratron 240 connects through a grid resistance 247 to a negative direct current source, and through coupling condensers to the short dip detector, the under height detector and the over height detector, respectively. Normally, during gauging the control grid of thyratron 240 is maintained at a sufficiently negative voltage with respect to its cathode to prevent "firing," switch 242 is closed, and condenser 245 has charged to a high positive potential through resistor 246. A reject pulse through any one of the coupling condensers to the control grid of thyratron 240, overcomes the control grid negative bias sufficiently to "fire" thyratron 240.

Condenser 245 is of sufficient capacity and is charged to a sufficient voltage to provide sufficient power to quickly operate the counter 242, the lamp 243 and the reject solenoid 67. Resistance 246 limits the flow of charging current to condenser 245, and the voltage available to operate counter 242 and the solenoid 67 soon drops to a low value, thereby protecting them. At the conclusion of the gauging period switch 241 opens, breaking the anode circuit to the thyratron 240. Condenser 245 charges quickly through resistor 246, and the control grid bias is restored to thyratron 240. The control grid negative voltage supply is composed of a secondary 250 of transformer 80, a rectifier 251 and a filter condenser 252. Condenser 260 in parallel with switch 241 prevents repeat firing of thyratron 240.

The heaters of all the cathode follower tubes are connected to and heated by the secondary 253 of a transformer 254, the center tap of the secondary connecting to a direct current supply at the junction of resistor 88 and condenser 89. The primary 255 of transformer 254 connects to the A.C. mains. The heaters of rectifier 137 and gate tube 135, 136 are also connected to secondary 253 of transformer 254.

Each of the detector thyratrons has its individual heater supply. The triodes 87, 94, 105, 106, 117, 123 and thyratron 240 have their heaters connected to and are heated by winding 250 of transformer 80.

Operation

In operation, carriage 20 is operated intermittently to grip a jar J and bring it into position on the pad 27. When the jaws 21 are opened, pad 27 is elevated bringing the jar J into engagement with the rollers 30 of the gauging head. As the gauging head 28 is rotated, the rollers 30 follow the top surface F of the container J and move upwardly and downwardly in response to variations in height of each successive portion of the finish. The movement of one of the rollers is transmitted to the core 61 of the differential transformer 62 creating an alternating current signal voltage which depends in magnitude and phase upon the position of the roller. This voltage is amplified in the amplifier and converted to a direct current voltage across condenser 127 that is proportional to the amplitude of the signal voltage from the differential transformer. The varying voltage appearing on the condenser 127 is simultaneously applied to the grids of the triodes in the warp detector 74, dip detector 75, cocked surface detector 73 and height discriminator 72.

Specifically, in the case of the warp detector 74, the varying voltage across the condenser 127 is applied to the grid of triode 150. The output signal of the triode is in phase and proportional to the signal at the grid. Condensers 153, 154 receive and store voltages through diodes 151, 152. When not gauging switch 191 is closed shorting the plates of the condensers 153, 154 and equalizing their voltages. When the switch 191 is open, the circuit is in gauging position. If the gauging roller rises in its contact with the top surface of the container, condenser 153 follows the rising voltage at the cathode of triode 150 by charging through diode 151. Condenser 154 also follows the rising voltage but at a slower rate by charging through resistor 156. If the gauging roller rises slowly, condenser 154 will charge substantially as fast as condenser 153 so that the difference between their voltages will be small. However, if the gauging roller rises moderately to very fast for some distance, then condenser 153 charges much faster than condenser 154 and the voltages on the condensers will become unbalanced. The voltage differential of the output of the triodes 162, 163 is controlled by the voltages existing across the condensers 153, 154 and opposes the negative bias placed on the grid of the thyratron 169 by the potentiometer 166. If the roller rises fast enough or long enough, the thyratron 169 will fire. In a similar manner, when the gauging roller lowers, condenser 154 follows the lessening voltage at the cathode of triode 150 by charging through diode 152 and condenser 153 follows the lessening voltage by charging through resistor 155. If the voltages at the cathode of triode 150 fall fast enough or for a long enough period of time, the voltage across the condensers 153, 154 becomes unbalanced, the outputs of triodes 162, 163, in turn, become unbalanced and thyratron 169 fires generating a reject signal on the condenser 183. This signal is transmitted to the reject thyratron 240 to energize the reject solenoid 67.

A similar circuit is used for detecting dips, the combination of condensers 153, 154 and resistances 155, 156 being changed so that defects that produce a greater rise in voltage over a shorter distance are detected.

In the case of the cocked finish detector, the varying voltage appearing across condenser 127 is applied to the grid of triode 150a. Condenser 204 charges to a voltage corresponding to the highest point of the finish of the bottle and condenser 205 charges to a voltage corresponding to the lowest point of the finish of the bottle. If the deviation between the highest and lowest point exceeds a predetermined value as set by potentiometer 203, resulting in an unbalance on the charges of condensers 204, 205, a reject pulse is created by firing of thyratron 202, which pulse is applied to the reject thyratron 240 to energize the reject solenoid 67.

In the case of the height discriminator, the varying voltage on the condenser 127 is applied to the grid of triode 218. If an under minimum height bottle is present, a negative signal is provided at the control grid of triode 218 which fires the thyratron 219. If an over-height bottle is present, a positive signal is applied to the thyratron 229 firing the thyratron 229. Firing of either the thyratron 219 or thyratron 229 produces a pulse signal that is, in turn, applied to the reject thyratron grid to energize reject solenoid 67.

It can thus be seen that there has been provided a bottle gauging apparatus which will simultaneously check the finish of a jar J for a warp finish, dip finish, cocked finish and over or under height.

We claim:
1. An apparatus for inspecting the finish of a hollow container including
   means for scanning the top finish of the container and creating an alternating current voltage proportional to the height of successive portions of the finish of the container,
   means for amplifying said alternating current signal voltage,
   means for converting said alternating current signal voltage to a direct current signal voltage,
   a pair of condensers to which said direct current voltage is directed,
   valve means individual to each said condenser permitting one of said condensers to be charged during an increasing voltage signal and the other to be charged during a decreasing voltage signal,
   a pair of triodes,
   a thyratron,
   and means interconnecting said thyratron to said triodes in such a manner that an unbalance in the output of said triodes produces a voltage signal pulse.

2. An apparatus for inspecting the finish of a hollow container including
   means for scanning the top surface of the finish of the container and creating an alternating current voltage proportional to the height of successive portions of the finish of the container,
   means for amplifying said alternating current signal voltage,
   means for converting said alternating current signal voltage to a direct current signal voltage,
   and a pair of condensers connected and adapted to receive said direct current voltage,
   a diode individual to each said condenser permitting one of said condensers to be charged during an increasing voltage signal and the other to be charged during a decreasing voltage signal,
   a pair of triodes,
   and means interconnecting the thyratron to said triodes to produce a voltage pulse when the output of said triodes is unbalanced.

3. The method of inspecting the finish of a hollow container which comprises
   scanning the finish to ascertain variations in vertical position of various portions of the finish,
   converting the variation in vertical position of various portions of the finish to alternating current signal voltage,
   amplifying said alternating current signal voltage,
   converting said alternating current voltage to a direct current signal voltage,
   applying said direct currrent signal voltage to a pair of condensers,
   permitting the charge of one condenser to leak at a predetermined rate from said condenser when the signal voltage is rising,
   permitting the charge of the other condensers to leak at a predetermined rate from the other condenser when the signal voltage is lessening,
   and rejecting the container when there is any substantial unbalance between the charges of the condensers.

4. The method of inspecting the finish of a hollow container which comprises
   scanning the finish to ascertain variations in vertical positions of various portions of the finish,
   converting the variation in vertical position of various portions of the finish to alternating current signal voltage, amplifying said alternating current signal voltage, converting said alternating current signal voltage to a direct current signal voltage, applying said direct current signal to a pair of condensers, permitting the charge of one condenser to leak at a predetermined rate from said condenser when the signal voltage is rising, permitting the charge of the other condenser to leak at a predetermined rate from the other condenser when the signal voltage is lessening, causing any substantial unbalance in the charge of the condensers to produce a signal, and causing said signal to energize a circuit for rejecting the container.

5. The method of inspecting the finish of a hollow container which comprises scanning the finish to ascertain variations in vertical position of various portions of the finish, converting the variation in vertical position of various portions of the finish to alternating current signal voltage, amplifying said alternating current signal voltage, converting said alternating current signal voltage to a direct current signal voltage, applying said direct current signal voltage to one condenser when said direct signal voltage is rising, applying said direct current signal voltage so another condenser when said direct current signal voltage is lessening, comparing the charges on said condensers with a predetermined standard, and rejecting that container when said differential in charges exceeds said predetermined standard.

6. The method of inspecting the finish of a hollow container which comprises scanning the finish to ascertain variations in vertical position of various portions of the finish, converting the variation in vertical position of various portions of the finish to alternating current signal voltage, amplifying said alternating current signal voltage, converting said alternating current signal voltage to a direct current signal voltage, comparing the maximum direct current signal voltage with a predetermined standard and the minimum direct current signal voltage with a second predetermined standard, and rejecting the container when one of said voltages exceeds its respective standard.

7. An apparatus for inspecting the finish of a hollow container including means for scanning the top surface of the finish of the container and creating an alternating current voltage proportional to the height of successive portions of the finish of the container, means for amplifying said alternating current signal voltage, means for converting said alternating current signal voltage to direct current signal voltage, and a pair of condensers connected and adapted to receive said direct current voltage, a resistance in parallel with each said condenser, a diode individual to each said condenser permitting one of said condensers to be charged during an increasing voltage signal and the other to be charged during a decreasing voltage signal, a pair of triodes, and means interconnecting the thyratron to said triodes to produce a voltage pulse when the output of said triodes is unbalanced.

8. An apparatus for inspecting the finish of a hollow container including means for scanning the top surface of the finish of the container and creating an alternating current voltage proportional to the height of successive portions of the finish of the container, means for amplifying said alternating current signal voltage, means for converting said alternating current signal voltage to a direct current signal voltage, a triode to which said signal is applied, a pair of thyratrons, one of said thyratrons being so connected to said circuit that it is energized by a negative signal of predetermined magnitude from said triode, and the other of said thyratrons being so connected to said circuit that it is energized by a positive signal of predetermined magnitude from said triode, and a condenser which is adapted to be charged when either of said thyratrons is energized.

9. The method of inspecting the finish of a hollow container which comprises scanning the top surface of the finish of the container to ascertain variations in the vertical position of various portions of the top surface of the finish, continuously sensing for a warp or dip condition wherein the vertical variation is greater than a predetermined standard in a unit peripheral distance of the finish, for a cocked finish condition wherein the vertical variation between the maximum and minimum exceeds a predetermined maximum, and for an over or under height condition wherein the vertical variation from an intermediate position exceeds a predetermined value, and rejecting the container when any one of the aforementioned conditions exists.

10. The method of inspecting the finish of a hollow container which comprises scanning the top surface of the finish of the container to ascertain variations in the vertical position of various portions of the top surface of the finish, continuously sensing for a warp or dip condition wherein the vertical variation is greater than a predetermined standard in a unit peripheral distance of the finish, for a cocked finish condition wherein the vertical variation between the maximum and minimum exceeds a predetermined maximum, and for an over or under height condition wherein the vertical variation from an intermediate position exceeds a predetermined value, creating a varying electrical signal corresponding to the varying vertical position of the top surface of the finish, and rejecting the container when one of the aforementioned conditions exists as evidenced by a variation in the electrical signal which is greater than a predetermined standard in a unit peripheral distance of the finish less than the entire finish due to a dip or warp finish condition, a variation between the maximum and minimum electrical signals which is greater than a predetermined maximum due to a cocked finish condition, or a variation in the electrical signal from an intermediate signal which exceeds a predetermined value due to an over or under height condition.

11. The method set forth in claim 10 wherein said varying electrical signal comprises a varying voltage signal, including the steps of comparing said varying voltage signal to a predetermined maximum voltage signal for said warp or dip finish condition, to a predetermined maximum voltage signal for said cocked finish condition, and to a predetermined voltage signal for said over or under height condition.

12. An apparatus for inspecting the finish of hollow containers which comprises means for continuously scanning the vertical position of portions of the top surface of the finish of a container for a warp or dip condition wherein the vertical variation is greater than a predetermined standard in a unit peripheral distance of the finish, for a cocked finish condition wherein the vertical variation between the maximum and minimum exceeds a predetermined maximum, and for an over or under height condition wherein the vertical variation from an intermediate position exceeds a predetermined value, means for creating a varying electrical signal corresponding to the varying vertical position of the portions of the top surface of the finish, means for comparing said varying electrical signal to a predetermined maximum signal for said warp or dip finish condition, to a predetermined maximum electrical signal for said cocked finish condition and a predetermined electrical signal for said over and under height condition, and means for creating a reject signal when one of said conditions exists.

13. An apparatus for inspecting the finish of hollow containers which comprises a support on which a container is adapted to be supported for inspecting,
a head,
a plurality of contact members mounted on said head for vertical movement relative thereto,
a differential transformer mounted above the head and including a coil fixed with relation to said head and a movable core,
means interconnecting one of said contact members with said movable core,
and means for causing relative rotation between said head and said support thereby causing said contact members to traverse and scan the periphery of a container on said support.

14. The combination set forth in claim 13 wherein said contact members comprise rollers mounted for rotation about horizontal axes.

15. The combination set forth in claim 13 including means for moving said head and said support relatively toward and away from one another.

References Cited by the Examiner
UNITED STATES PATENTS

| | | | |
|---|---|---|---|
| 2,988,218 | 6/1961 | Fedorchak | 209—88 |
| 3,018,889 | 1/1962 | Fouse | 209—88 |
| 3,073,034 | 1/1963 | Antoszewski | 209—88 X |

M. HENSON WOOD, JR., *Primary Examiner.*

R. A. SCHACHER, *Assistant Examiner.*